(12) United States Patent
Elhebeary et al.

(10) Patent No.: US 10,152,072 B1
(45) Date of Patent: Dec. 11, 2018

(54) FLIP VOLTAGE FOLLOWER LOW DROPOUT REGULATOR

(71) Applicant: QUALCOMM Incorporated, San Diego, CA (US)

(72) Inventors: Mahmoud Mohamed Rashad Ibrahim Elhebeary, Los Angeles, CA (US); Sameer Wadhwa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/828,608

(22) Filed: Dec. 1, 2017

(51) Int. Cl.
*G05F 1/59* (2006.01)
*G05F 1/575* (2006.01)
*G05F 1/46* (2006.01)
*H02M 1/088* (2006.01)
*G05F 1/565* (2006.01)

(52) U.S. Cl.
CPC ............... *G05F 1/59* (2013.01); *G05F 1/468* (2013.01); *G05F 1/565* (2013.01); *G05F 1/575* (2013.01); *H02M 1/088* (2013.01)

(58) Field of Classification Search
CPC . G05F 1/613; G05F 1/618; G05F 1/59; G05F 1/595; G05F 1/563; G05F 1/56; G05F 1/575; G05F 1/465; G05F 1/468; G05F 1/462; G05F 1/562; G05F 1/565; G05F 1/567; G05F 1/569; G05F 1/571; G05F 1/573
USPC ................. 323/226, 269–270, 273–281
See application file for complete search history.

(56) References Cited

U.S. PATENT DOCUMENTS

| | | | |
|---|---|---|---|
| 8,547,077 B1 * | 10/2013 | Chang | G05F 1/575 323/275 |
| 8,878,513 B2 * | 11/2014 | Wong | G05F 1/56 323/267 |
| 9,740,225 B1 | 8/2017 | Wong | |
| 2016/0202714 A1 | 7/2016 | Luria et al. | |
| 2017/0010316 A1 | 1/2017 | Gerna et al. | |
| 2017/0060157 A1 | 3/2017 | Jefremow et al. | |
| 2017/0294889 A1 | 10/2017 | Pavao-Moreira et al. | |

* cited by examiner

*Primary Examiner* — Nguyen Tran
(74) *Attorney, Agent, or Firm* — Qualcomm Incorporated

(57) ABSTRACT

A wide-tuning range low output impedance flip voltage follower (FVF) low dropout regulator (LDO) for large capacitor switching loads is disclosed. In some implementations, the LDO includes an operational amplifier and a FVF. The FVF can have a gain device, a source follower device, and an adaptive level shifter coupled between a drain of the source follower device and a gate of the gain device.

5 Claims, 7 Drawing Sheets

FLIP VOLTAGE FOLLOWER LOW DROPOUT REGULATOR

FIELD OF DISCLOSURE

The present disclosure relates generally to signal drivers in electronic circuitry, and more particularly to wide-tuning range low output impedance flip voltage follower (FVF) low dropout regulators (LDOs) for large capacitive switching loads.

BACKGROUND

Low dropout regulators (LDOs) are used in many electronic devices today, especially portable electronic devices. For example, LDOs are often used in driving signals in touch sensing controllers of touch sensing systems of display panels. In such applications, the LDOs typically should work with large capacitive switching load (e.g., 100 pF) with series resistance (e.g., 1k Ohm) at high frequency (e.g., 400 kHz). The capacitive load is usually replicated multiple times (e.g., 32) so that multiple rows of signals can be driven across a display panel. The RC-load is panel dependent and varies from one panel to another depending upon the touch-screen sensor technology used. Because the capacitive load varies widely and the load replicated multiple times depending upon sensing mode, a single closed loop LDO solution cannot be implemented due to stability issues.

A conventional solution is to provide a LDO with a single close loop having a source follower and an operational amplifier and a plurality of source follower replicas. FIG. 1 shows a conventional LDO usable in a touch sensing controller driver. The LDO 100 includes an operational amplifier 110, a source follower block 120, and a plurality of replica source follower blocks 130. To avoid obscuring the illustration, only one (1) replica source follower block 130 is shown. However, it should be appreciated that there are multiple identical replica source follower blocks 130 in the signal driver 100 (for example, 32 replica source follower blocks). The source follower block 120 includes a source follower device M1 and a bias device M2 connected to each other in series. Likewise, the replica source follower block 130 includes a source follower device $M_{1r}$ and a gain device $M_{2r}$ connected in series. The gates of both M2 and $M_{2r}$ are driven by a bias signal $I_{BIAS}$.

As shown in FIG. 1, the gates of both M1 and $M_{1r}$ are coupled to an output of operational amplifier 110. A positive input of operational amplifier 110 receives a reference voltage $V_{REF}$. The source of M1, which is coupled to the drain of M2, is feedback to a negative input of operational amplifier 110 to form a close loop. Thus, the voltage at the source of M1 is designated as $V_{OUT\_CL}$. In contrast, the source of $M_{1r}$, which is connected to the drain of $M_{2r}$, is not feedback to operational amplifier 110. The voltage at the source of $M_{1r}$ is designated as $V_{OUT\_CL}$. $V_{OUT\_CL}$ is the output voltage of LDO 100. Thus, the driver using LDO 100 is referred to as "open loop" because the output load is not in the feedback loop formed by M1, M2, and operational amplifier 110.

One problem with the open loop driver is its size. Low output impedance is needed to charge and discharge the capacitive load in time (e.g., in less than 1.25 μsec). So, the source follower topology would result in very large devices (e.g., $M_{1r}$ in FIG. 1) since the output impedance is 1/gm. A large $M_{1r}$ can lead to significant power loss. To reduce the size of the driver, some conventional drivers have adopted a flip voltage follower (FVF) topology that allows the use of smaller devices.

FIG. 2 shows one example of a conventional low-side LDO with an FVF output stage usable in a touch sensing controller driver. A supply-side LDO with an FVF configuration could be constructed with a complementary design. LDO 200 includes an operational amplifier 210, a FVF 220, and a plurality of replica FVFs 230. To avoid obscuring the illustration, only one (1) replica FVF 230 is shown. However, it should be appreciated that there are multiple identical replica FVF 230 in the LDO 200 (for example, 32 replica FVFs). The FVF 220 includes a source follower device M1 and a gain device M2 connected in series. Likewise, the replica FVF 230 includes a source follower device $M_{1r}$ and a gain device $M_{2r}$ connected in series. The gates of both M1 and $M_{1r}$ are coupled to the output of operational amplifier 210. A bias device Mb is coupled between the drain of M1 and a power supply rail Vdd. Likewise, a bias device $M_{br}$ is coupled between the drain of $M_{1r}$ and Vdd.

The gate of M2 is coupled to the drain of M1. So M2 forms a tight local feedback loop in conjunction with M1 and Mb. Likewise, the gate of $M_{2r}$ is coupled to the drain of $M_{1r}$. So $M_{2r}$ forms a tight local feedback loop in conjunction with $M_{1r}$ and $M_{br}$. A positive input of operational amplifier 210 receives a reference voltage $V_{REF}$. An output of operational amplifier 210 drives the gate of M1, while the source of M1 is feedback to a negative input of operational amplifier 210, thus forming a closed loop. In contrast, the source of $M_{1r}$ is not feedback to the operational amplifier 210. An output voltage is taken at the source of $M_{1r}$. So the LDO 200 has an open loop configuration. Low output impedance is needed to charge and discharge the capacitive load in time (e.g., in less than 1.25 μsec). Using FVF topology as the second stage of LDO 200 results in an output impedance that is lowered by the loop gain. This will allow use of smaller devices, and hence smaller area.

However, one drawback of the FVF topology is the tight range of operation (typically 0.15-0.3 V) because Vgs–Vt (M2)>=Vdsat(M1)+Vdsat(M2) to ensure both M1 and M2 operate in saturation region. Achieving a large output range in LDO 200 would require setting M2 with a large Vgs–Vt, which requires using a very weak M2. This is counterproductive because M2 is providing all the load current in LDO 200. In sum, achieving large output range comes at a cost of degrading output impedance of LDO 200.

Therefore, there is a need in touch sensing controller design to provide a LDO with a wide tuning range without sacrificing the low output impedance.

SUMMARY OF THE DISCLOSURE

The following presents a simplified summary of one or more implementations to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

Some implementations include a wide tuning-range and low output impedance FVF LDO. The LDO may include an operational amplifier and a FVF. The FVF can have a gain device, a source follower device, and an adaptive level shifter coupled between a drain of the source follower device and a gate of the gain device. A gate of the source follower device can be coupled to the output of the operational amplifier and a drain of the gain device is coupled to the negative input of the operational amplifier.

In some implementations, the adaptive level shifter comprises a first diode coupled between the drain of the source follower device and the gate of the gain device, a compensation capacitor coupled between the drain of the source follower and the gate of the gain device, and a second diode coupled between the gate of the gain device and a power rail. In a low-side LDO configuration, the source follower device can be an n-type metal oxide semiconductor (nMOS) M1, whereas the gain device can be an nMOS M2, and the ground rail can be Vss. Alternatively, in a supply-side LDO configuration, the source follower device is a p-type metal oxide semiconductor device (pMOS) M3, the gain device is a pMOS M4, and the power rail is Vdd.

In some implementations, the LDO further includes a plurality of replica FVFs. Each of the plurality of replica FVFs can include a replica gain device, a replica source follower device having a source to output an output voltage, and a gate coupled to the output of the operational amplifier, and a replica adaptive level shifter coupled between a drain of the replica source follower device and a gate of the replica gain device.

In some implementations, the replica adaptive level shifter comprises a third diode coupled between the drain of the replica source follower device and the gate of the replica gain device, a replica compensation capacitor coupled between the drain of the replica source follower and the gate of the replica gain device, and a fourth diode coupled between the gate of the replica gain device and a power rail. The replica source follower device can be an n-type metal oxide semiconductor device (nMOS), whereas the replica gain device can be an nMOS, and the ground rail can be Vss. Alternatively, the replica source follower device is a p-type metal oxide semiconductor device (pMOS), the replica gain device is a pMOS, and the power rail is Vdd.

In some implementations, a touch sensing controller driver includes a plurality of switches, each of the plurality of switches configured to couple to a signal line of a touch panel and a signal driver having an upper supply-side low dropout regulator (LDO) and a lower LDO. The upper LDO can be coupled to the plurality of switches to supply current to the plurality of switches, and the lower low-side LDO can be coupled to the plurality of switches to sink current from the plurality of switches. The upper and lower LDOs can be built with some implementations of LDOs disclosed herein.

In some implementations, an electronic system includes a touch sensing panel and a touch sensing controller driver coupled to the touch sensing panel. The touch sensing controller can be implemented as set forth above.

To the accomplishment of the foregoing and related ends, the one or more implementations include the features hereinafter fully described and particularly pointed out in the claims. The following description and the annexed drawings set forth in detail certain illustrative implementations. These implementations are indicative, however, of but a few of the various ways in which the principles disclosed may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details to provide a thorough understanding of the various concepts. However, it will be apparent to those skilled in the art that these concepts may be practiced without these specific details. In some instances, well-known structures and components are shown in block diagram form in order to avoid obscuring such concepts.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements may be physical, logical, or a combination thereof. As used herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not limit the quantity or order of the element. Rather, the designations are used herein as a convenient method of distinguishing between two or more elements or instances of an element. Thus, a reference to first and second elements does not mean that only two elements can be employed, or that the first element must precede the second element. As used herein, references to the plural include the singular, and references to the singular include the plural.

Figure 1:
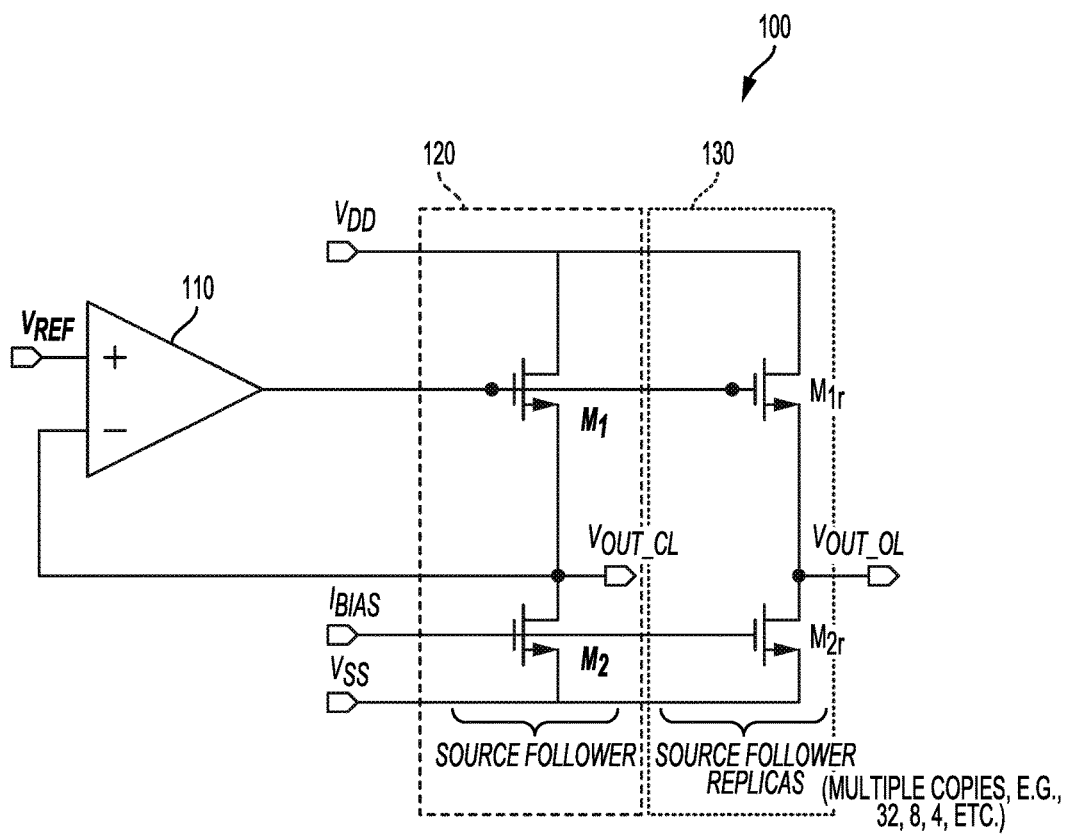
FIG. 1 shows a conventional LDO usable in a touch sensing controller driver.
Figure 2:
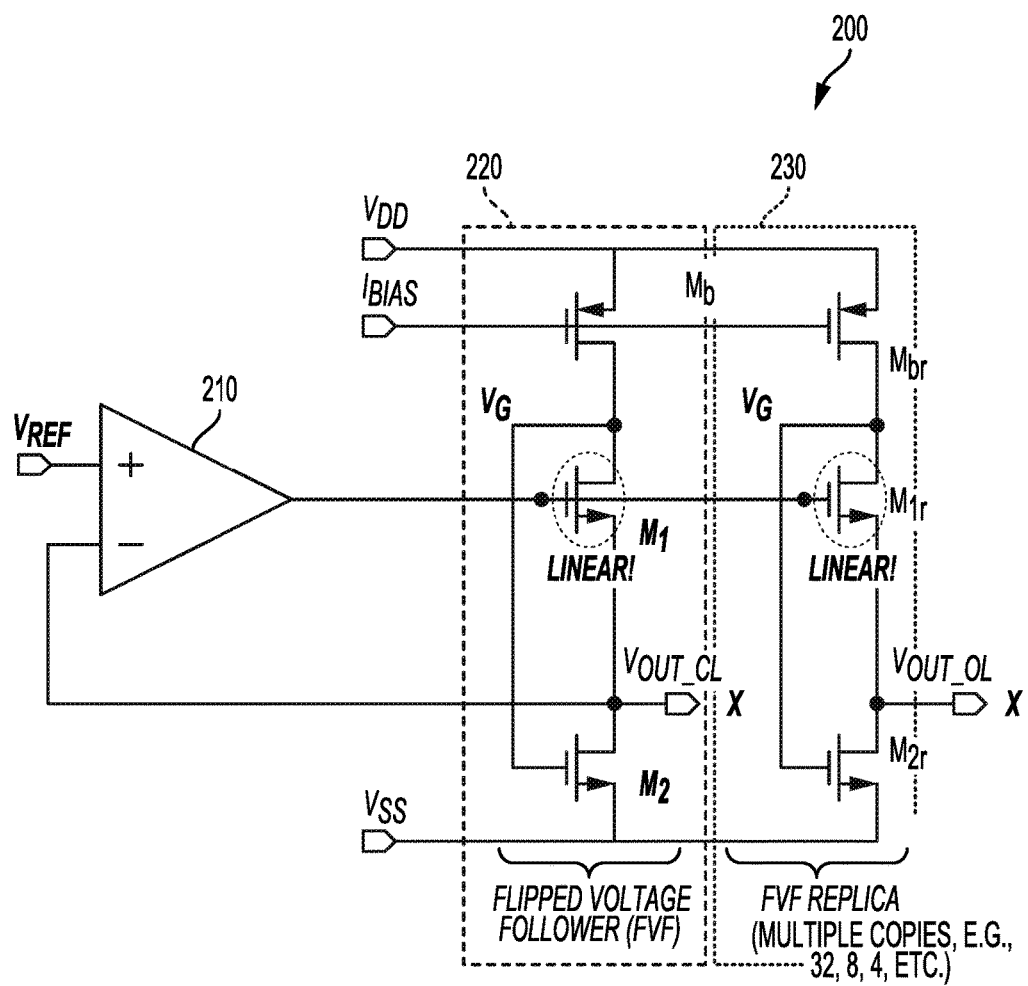
FIG. 2 shows one example of a conventional LDO with a FVF topology usable in a touch sensing controller driver.
Figure 3:
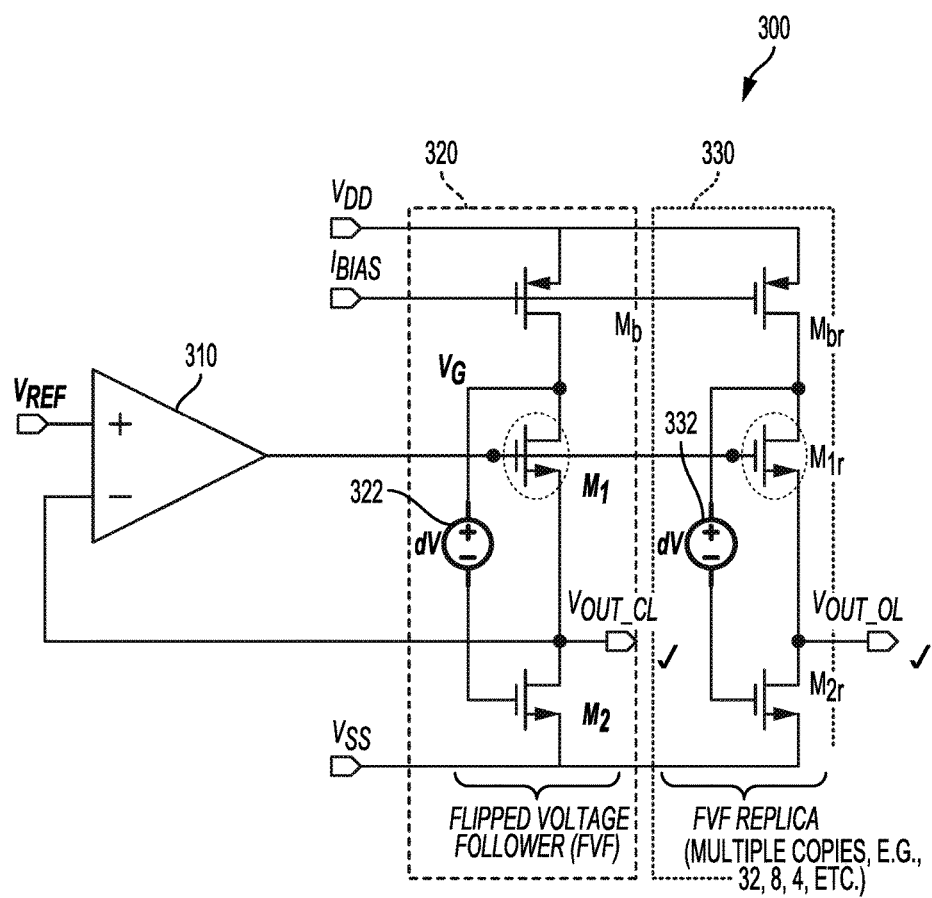
FIG. 3 illustrates one implementation of a wide tuning range low output impedance flip voltage follower (FVF) low dropout regulator (LDO).

FIG. 3 illustrates one implementation of a wide tuning range low output impedance flip voltage follower (FVF) low dropout regulator (LDO). The LDO 300 shown can be used in touch sensing controller to drive signals across a touch screen. The LDO 300 includes an operational amplifier 310, a flip voltage follower (FVF) 320, and a plurality of replica FVFs 330. To avoid obscuring the illustration, only one (1) replica FVF 330 is shown. However, it should be appreciated that there are multiple identical replica FVFs 330 in the LDO 300 (for example, 32 replica FVFs, 8 replica FVFs, 4 replica FVFs, etc.).

In some implementations, FVF 320 includes a source follower device M1 and a gain device M2 connected in series. The gate of M1 is coupled to and driven by an output of operational amplifier 310. A positive input of operational amplifier 310 receives a reference voltage $V_{REF}$. The source of M1 is coupled to a negative input of operational amplifier 310 to form a closed loop. The voltage at the source of M1 is thus designated as $V_{OUT\_CL}$. A bias device Mb is coupled between the drain of M1 and a power supply rail Vdd. A level-shifting voltage source 322 is coupled between the drain of M1 and the gate of M2. The level-shifting voltage source 322 level shifts the drain voltage of M1 and applies the level shifted drain voltage of M1 to drive the gate of M2. In other words, the level-shifting voltage source 322 is used to bias M2. While having the level-shifting voltage source 322 biasing M2 can help mitigate the tight range of operation of the LDO 300, the problem in this approach is lower stability and more current consumption because the level-shifting voltage source 322 is not adaptive.

Like FVF 320, each replica FVF 330 includes a source follower device $M_{1r}$ and a gain device $M_{2r}$. The gate of $M_{1r}$ is coupled to the output of operational amplifier 310. The source of $M_{1r}$ is coupled to the drain of $M_{2r}$. Another level-shifting voltage source 332 is coupled between the drain of $M_{1r}$ and the gate of $M_{2r}$. A bias device Mb is coupled between the drain of $M_{1r}$ and Vdd. An output voltage $V_{OUT\_OL}$ of LDO 300 is taken from the node at which the source of $M_{1r}$ and the drain of $M_{2r}$ are coupled together. Note that the source of $M_{1r}$ is not feedback to operational amplifier 310, unlike the source of M1 in FVF 320. Thus, the output of LDO 300 is in an open loop with respect to the main op-amp, which results in a design that is relatively insensitive to output load. Like level-shifting voltage source 322 in FVF 320, level-shifting voltage source 332 in replica FVF 330 level shifts the drain voltage of $M_{1r}$ to bias $M_{2r}$. Although such biasing helps alleviate the tight range of operation of the LDO 300, the problem of instability and high current consumption remains.

Figure 4:
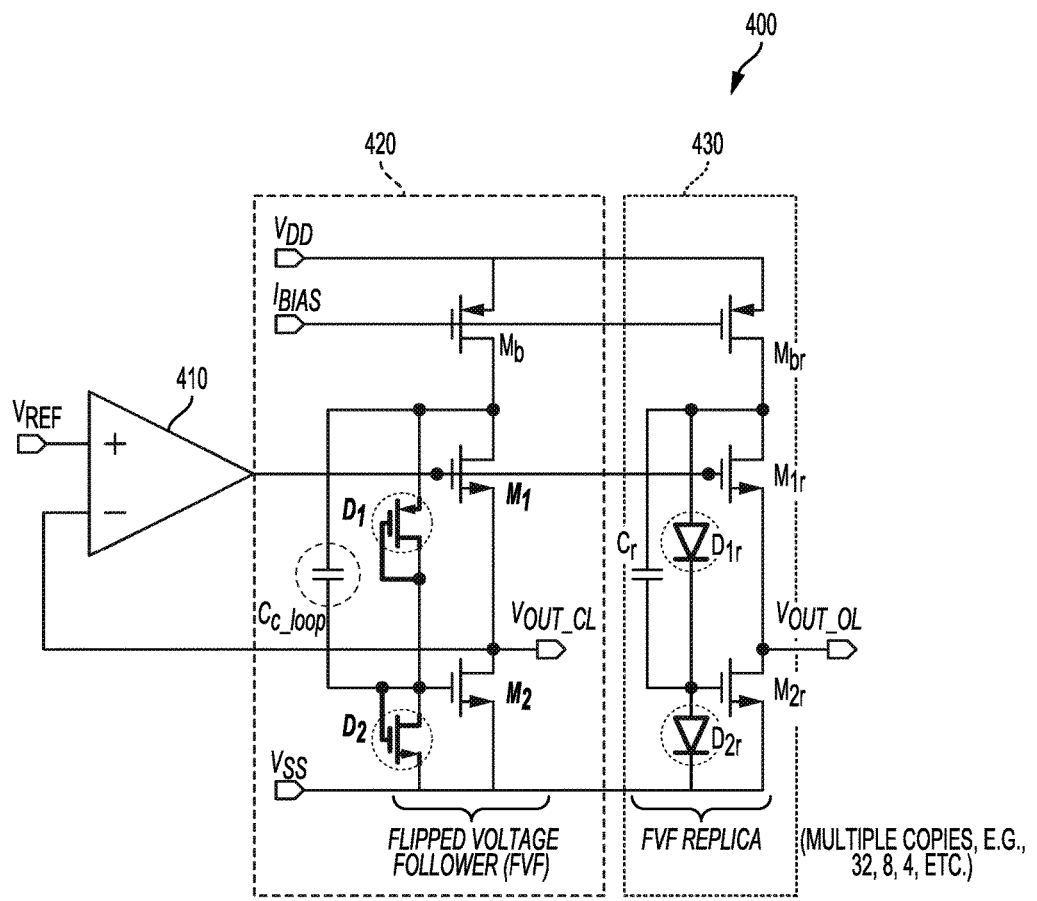
FIG. 4 illustrates one implementation of a wide tuning range low output impedance FVF LDO.

FIG. 4 illustrates another implementation of a wide tuning range low output impedance FVF LDO. The LDO 400 includes The LDO 400 shown can be used in touch sensing controller to drive signals across a touch screen. The LDO 400 includes an operational amplifier 410, a flip voltage follower (FVF) 420, and a plurality of replica FVFs 430. To avoid obscuring the illustration, only one (1) replica FVF 430 is shown. However, it should be appreciated that there are multiple identical replica FVF 430 in the LDO 400 (for example, 32 replica FVFs, 8 replica FVFs, 4 replica FVFs, etc.).

In some implementations, FVF 420 includes a source follower device M1 and a gain device M2 connected in series. The gate of M1 is coupled to an output of operational amplifier 410. A positive input of operational amplifier 410 receives a reference voltage $V_{REF}$. In some implementations, $V_{REF}$ is within a range of 0.15V to 0.8V. The source of M1 is coupled to a negative input of operational amplifier 410 to form a closed loop. The voltage at the source of M1 is thus designated as $V_{OUT\_CL}$. In some implementations, $V_{OUT\_CL}$ is within a range of 0.15V to 0.8V. A bias device Mb is coupled between the drain of M1 and a power supply rail Vdd. An adaptive level shifter 422 is coupled between the drain of M1 and the gate of M2 and Vss. Adaptive level shifter 422 adaptively level shifts the drain voltage of M1 to bias M2. Adaptive level shifter 422 tracks the output current of FVF 420. In other words, adaptive level shifter 422 is adaptive according to the load condition, thus providing adaptive bandwidth and adaptive current consumption. Such adaptive nature of adaptive level shifter 422 lowers current consumption and provides greater stability in the loop formed by M1, M2, and operational amplifier 410.

In some implementations, adaptive level shifter 422 includes a diode connected p-type transistor $D_1$, a diode connected n-type transistor $D_2$, and a compensation capacitor $C_{c\_loop}$. As illustrated in FIG. 4, the source of $D_1$ is coupled to the drain of M1. The drain of $D_1$, which is diode connected to the gate of $D_1$, is connected to the drain and gate of $D_2$ and the gate of M2. As such, $D_2$ provides a path for the kick-back gate voltage of M2. The source of $D_2$ is connected to Vss, which is ground in some implementations. The saturation condition can now be rewritten as Vgs−Vt(M2)+VD1>=Vdsat(M1)+Vdsat(M2), where VD1 is the voltage across the diode connected p-type transistor $D_1$. Vgs−Vt(M2) can be now set to a lower value (thus using a larger M2 device). This results in a lower impedance design with a wide output range. The current through the feedback path (i.e., the current going through M1) tracks the current through $D_1$. $D_2$ provides a path for the kick-back gate voltage of M2. Compensation capacitor $C_{c\_loop}$ is connected in parallel to $D_1$ and provides a shunt feedback path. Since adding adaptive level shifter 422 in the feedback path with small current will create a dominant pole, adding compensation capacitor $C_{c\_loop}$ in the shunt feedback path to add a zero in the path can address this issue.

Like FVF 420, each replica FVF 430 includes a source follower device $M_{1r}$ and a gain device $M_{2r}$. The gate of $M_{1r}$ is coupled to the output of operational amplifier 410. The source of $M_{1r}$ is coupled to the drain of $M_{2r}$. Another adaptive level shifter 432 is coupled between the drain of $M_{1r}$ and the gate of $M_{2r}$. A bias device $M_{br}$ is coupled between the drain of $M_{1r}$ and Vdd. An output voltage is taken from the node at which the source of $M_{1r}$ and the drain of $M_{2r}$ are coupled together. Note that the source of $M_{1r}$ is not feedback to operational amplifier 410, unlike the source of M1 in FVF 420. Thus, the output of the LDO 400 is in an open loop with respect to operational amplifier 410, which results in a design that is relatively insensitive to output load.

In some implementations, adaptive level shifter 432 includes a diode connected p-type transistor $D_{1r}$, a diode-connected n-type transistor $D_{2r}$, and a replica compensation capacitor Cr. The source of $D_{1r}$ is coupled to the drain of $M_{1r}$. The drain of $D_{1r}$, which is diode connected to the gate of $D_{1r}$, is connected to the drain and gate of $D_{2r}$ and the gate of $M_{2r}$. As such, $D_{2r}$ provides a path for the kick-back gate voltage of $M_{2r}$. The source of $D_{2r}$ is connected to Vss, which is ground in some implementations. Replica compensation capacitor Cr is connected in parallel to $D_{1r}$. The operation of adaptive level shifter 432 in replica FVF 430 is substantially similar to the operation of adaptive level shifter 422 in FVF 420 as discussed above.

Although the exemplary implementation of LDO 400 shown in FIG. 4 is built using n-type transistors as M1, M2, $M_{1r}$, and $M_{2r}$, one of skill in the art can readily recognize that alternative implementations of LDO 400 can be built using p-type transistors as M1, M2, $M_{1r}$, and $M_{2r}$ in a complementary fashion.

Figure 5:
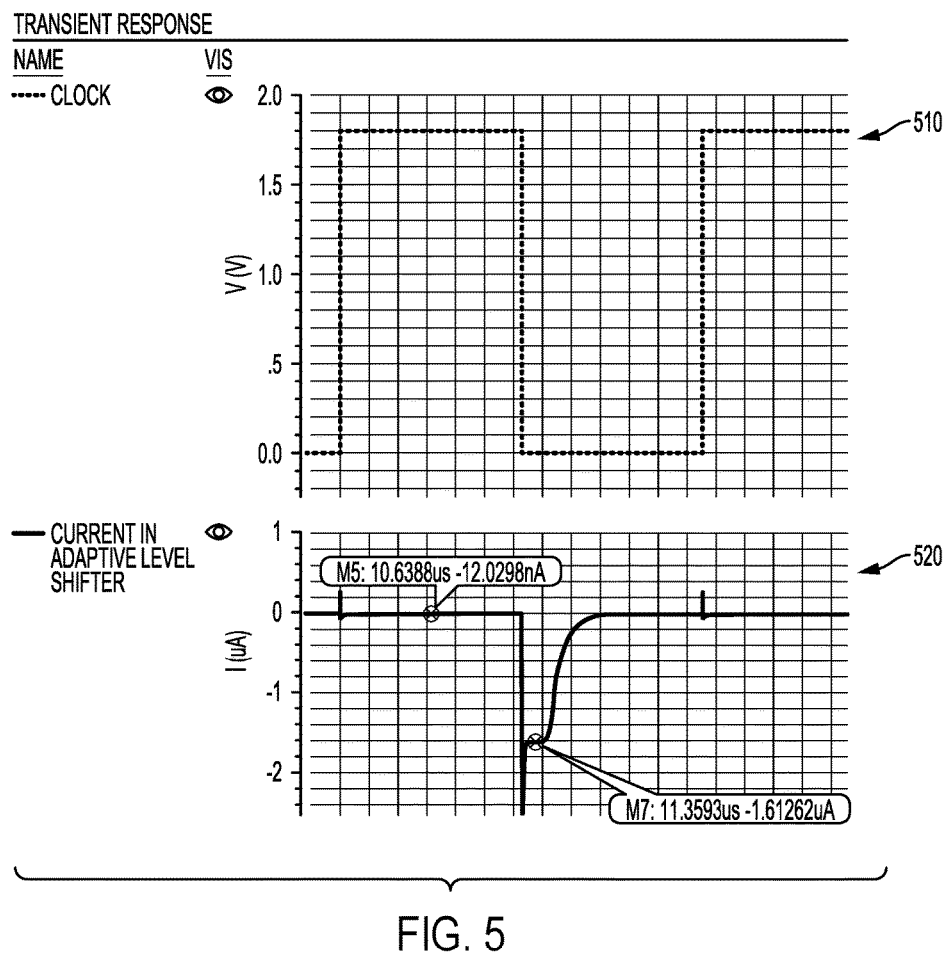
FIG. 5 shows the adaptive level shifter current measurement in one implementation of the LDO 400.

FIG. 5 shows the adaptive level shifter current measurement in one implementation of the LDO 400. In FIG. 5, waveform 510 represents a clock signal ranging from 0V to about 1.8V. Waveform 520 represents a current in adaptive level shifter 422. At no load, the current in adaptive level shifter 422 is at about 12 nA, and the current increases to about 1.6 µA when a large load is connected to allow fast charging. Having adaptive bandwidth stabilizes the loop in LDO 400 and allows low quiescent current in replica FVF 430. In addition, LDO 400 has lower current dissipation and occupies less are on silicon compared to some conventional LDOs.

Figure 6:
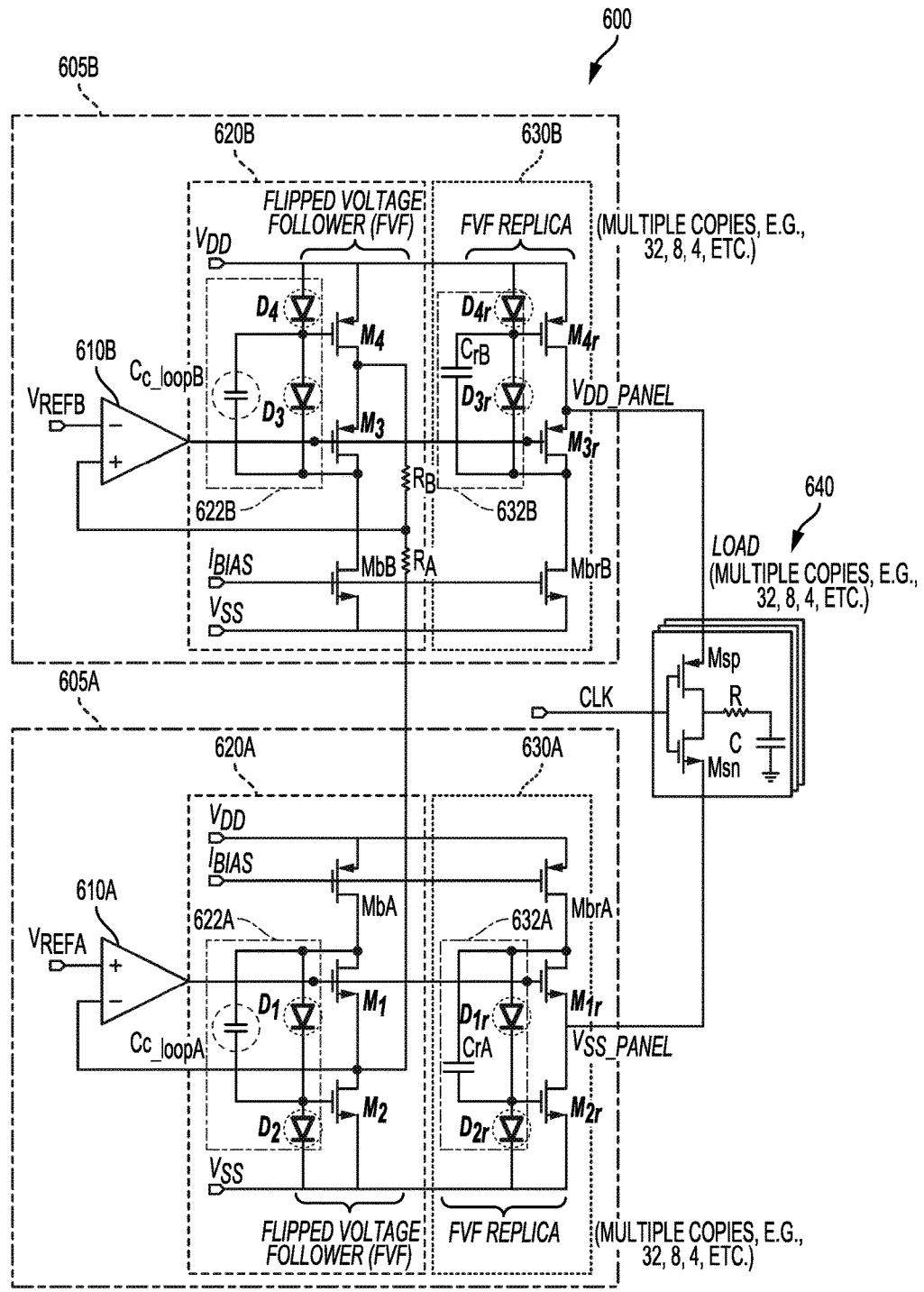
FIG. 6 illustrates one implementation of a touch sensing controller driver 600.

As discussed above, LDO 400 can be used in implementing touch sensing controller drivers to drive signals across touch sensing panels because of the open-loop architecture of LDO 400. FIG. 6 illustrates one implementation of a touch sensing controller driver 600. Driver 600 includes an upper LDO 605B, a lower LDO 605A, and a plurality of switches 640. Each of the switches 640 is configured to couple to a signal line of a touch sensing panel. The load resulted from coupling to the signal line is represented conceptually by R and C in FIG. 6. A clock signal CLK can be applied to the gates of Msp and Msn to turn on Msp and Msn to drive the respective signal line coupled to the drains of Msp and Msn. The number of switches 640 vary across implementations (e.g., 4 switches, 8 switches, 32 switches, etc.). In one implementation, each of the switches 640 includes a p-type metal oxide semiconductor transistor (pMOS) Msp and an n-type metal oxide semiconductor transistor (nMOS) Msn. The gates of pMOS Msp and nMOS Msn are coupled to each other while the drain of pMOS Msp is coupled to the source of nMOS Msn. A clock signal CLK can be applied to the gates of pMOS Msp and nMOS Msn to drive each of the switches 640. CLK can have a frequency between 50k and 400k Hz. The switch 640 outputs a signal at the drain of pMOS Msp and the source of nMOS Msn to drive the load represented by R and C. Upper LDO 605B provides a high voltage to the source of pMOS Msp, while lower LDO 605B provides a low voltage to the source of nMOS Msn. In other words, upper LDO 605B supplies current to the switches 640 while lower LDO 605A sinks current from the switches 640. The upper LDO 605B and lower LDO 605A can provide the switches 640 with wide range of supplies from both the top and bottom sides (e.g., 1-1.65 V, and 0.15-0.8 V, respectively).

As illustrated in FIG. 6, lower LDO 605A is substantially similar to LDO 400 shown in FIG. 4. Lower LDO 605A includes an operational amplifier 610A, a FVF 620A, and a plurality of replica FVFs 630A. The number of replica FVFs 630A is the same as the number of switches 640. An output of each replica FVF 630A is coupled to a respective one of the plurality of switches 640. FVF 620A includes a source follower device M1 and a gain device M2 connected in series. The gate of M1 is coupled to the output of operational amplifier 610A. A positive input of operational amplifier 610A receives a reference voltage $V_{REFA}$. $V_{REFA}$ can range from 0.15V to 0.8V in some implementations. The source of M1 is coupled to the negative input of operational amplifier 610A to form a closed loop. A bias device MbA is coupled between the drain of M1 and a power supply rail Vdd. The gate of MbA is driven by the signal $I_{BIAS}$. An adaptive level shifter 622A is coupled between the drain of M1 and the gate of M2 and Vss. Adaptive level shifter 622A includes a diode connected p-type transistor $D_1$, a diode connected n-type transistor $D_2$, and a compensation capacitor $C_{c\_loopA}$. The source of $D_1$ is coupled to the drain of M1. The drain of $D_1$, which is diode connected to the gate of $D_1$, is connected to the drain and gate of $D_2$ and the gate of M2. The source of $D_2$ is connected to Vss, which is ground in some implementations. Compensation capacitor $C_{c\_loopA}$ is connected in parallel to $D_1$. Like FVF 620A, each replica FVF 630A includes a source follower device $M_{1r}$ and a gain device $M_{2r}$. The gate of $M_{1r}$ is coupled to the output of operational amplifier 610A. The source of $M_{1r}$ is coupled to the drain of $M_{2r}$. An output voltage of LDO 605A is taken at the source of $M_{1r}$, designated as $V_{SS\_PANEL}$. In some implementations, $V_{SS\_PANEL}$ has a range of 0.15V to 0.8V. Another adaptive level shifter 632A is coupled between the drain of $M_{1r}$ and the gate of $M_{2r}$. A bias device MbrA is coupled between the drain of $M_{1r}$ and Vdd. The gate of MbrA is driven by the signal $I_{BIAS}$. An output voltage is taken from the node at which the source of $M_{1r}$ and the drain of $M_{2r}$ are coupled together. Note that the source of $M_{1r}$ is not feedback to operational amplifier 610A, unlike the source of M1 in FVF 620A. Adaptive level shifter 632A includes a diode connected p-type transistor $D_{1r}$, a diode-connected n-type transistor $D_{2r}$, and a replica compensation capacitor $C_{rA}$. The source of $D_{1r}$ is coupled to the drain of $M_{1r}$. The drain of $D_{1r}$, which is diode connected to the gate of $D_3$, is connected to the drain and gate of $D_{2r}$ and the gate of $M_{2r}$. As such, $D_{2r}$ provides a path for the kick-back gate voltage of $M_{2r}$. The source of $D_{2r}$ is connected to Vss, which is ground in some implementations. Replica compensation capacitor Cr is connected in parallel to $D_{1r}$.

Likewise, upper LDO 605B is also complementarily similar to LDO 400 shown in FIG. 4, except source follower devices $M_4$ and $M_{4r}$ and gain devices $M_3$ and $M_{3r}$ are implemented with pMOS instead of nMOS. The bias transistor Mb in FVF 620B of upper LDO 605B is coupled between the drain of $M_3$ and Vss, which can be ground in some implementations. Likewise, the bias transistor Mbr in replica FVF 630B of upper LDO 605B is coupled between the drain of $M_{3r}$ and Vss. Both MbB and MbrB are driven by $I_{BIAS}$.

Upper LDO 605B includes an operational amplifier 610B, a FVF 620B, and a plurality of replica FVFs 630B. The number of replica FVFs 630B is the same as the number of switches 640. An output of each replica FVF 630B is coupled to a respective one of the plurality of switches 640. FVF 620B includes a source follower device M3 and a gain device M4 connected in series. The gate of M3 is coupled to the output of operational amplifier 610B. A negative input of operational amplifier 610 receives a reference voltage $V_{REFB}$, which can be 0.9V in some implementations. The source of M3 is coupled to the positive input of operational amplifier 610B via a resistor $R_B$ to form a closed loop. In addition, the source of M3 in the lower LDO 605A is also coupled to the positive input of operational amplifier 610B via resistor $R_A$. A bias device MbB is coupled between the drain of M3 and a power supply rail Vss, which is ground in some implementations. The gate of MbB is driven by the signal $I_{BIAS}$. An adaptive level shifter 622B is coupled between the drain of M3 and the gate of M4 and $V_{DD}$. Adaptive level shifter 622B includes a diode connected transistor $D_3$, a diode connected transistor $D_4$, and a compensation capacitor $C_{c\_loopB}$. The source of $D_3$ is coupled to the drain of M3. The drain of $D_3$, which is diode connected to the gate of $D_3$, is connected to the drain and gate of $D_4$ and the gate of M4. The source of $D_4$ is connected to $V_{DD}$. Compensation capacitor $C_{c\_loopB}$ is connected in parallel to $D_3$. Like FVF 620B, each replica FVF 630AB includes a source follower device $M_{3r}$ and a gain device $M_{4r}$. The gate of $M_{3r}$ is coupled to the output of operational amplifier 610B. The source of $M_{3r}$ is coupled to the drain of $M_{4r}$. Another adaptive level shifter 632B is coupled between the drain of $M_{3r}$ and the gate of $M_{4r}$. A bias device MbrB is coupled between the drain of $M_{3r}$ and Vss. The gate of MbrB is driven by the signal $I_{BIAS}$. An output voltage is taken from the node at which the source of $M_{3r}$ and the drain of $M_{4r}$ are coupled together. Note that the source of $M_{3r}$ is not feedback to operational amplifier 610B, unlike the source of $M_3$ in FVF 620B. The voltage at the source of $M_{3r}$ is designated as $V_{DD\_PANEL}$. $V_{DD\_PANEL}$ can range from 1V to 1.65V in some implementations. Adaptive level shifter 632B includes a diode connected transistor $D_{3r}$, a diode-connected transistor $D_{4r}$, and a replica compensation capacitor $C_{rB}$. The source of $D_{3r}$ is coupled to the drain of $M_{3r}$. The drain of $D_{3r}$, which is diode connected to the gate of $D_{3r}$, is connected to the drain and gate of $D_{4r}$ and the gate of $M_{4r}$. As such, $D_{4r}$ provides a path for the kick-back gate voltage of $M_{4r}$. The source of $D_{4r}$ is connected to Vss, which is ground in some implementations. Replica compensation capacitor $C_{rB}$ is connected in parallel to $D_{3r}$.

In addition to the wide range of supplies from the upper LDO 605B and lower LDO 605A (e.g., 1-1.65 V, and 0.15-0.8 V, respectively), the FVF architecture shown in FIG. 6 consumes less area in comparison to the source follower architecture discussed above. A further advantage of the architecture shown in FIG. 6 is lower power consumption due to having adaptive level shifters in the upper LDO 605B and lower LDO 605A.

Figure 7:
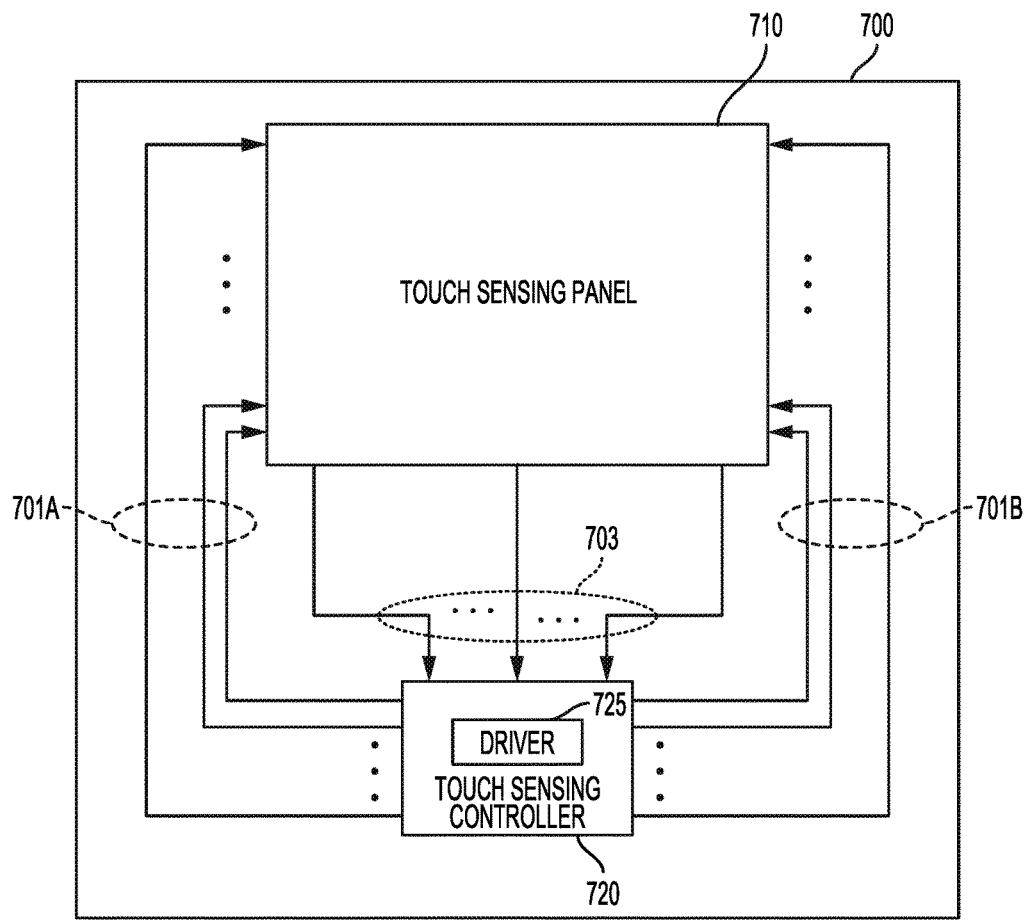
FIG. 7 illustrates one implementation of an electronic system.

FIG. 7 illustrates one implementation of an electronic system. Electronic system 700 can be a handheld device (e.g., smartphone, laptop computer, smart watch, etc.), a desktop computer, a kiosk, an automatic teller machine (ATM), etc. System 700 includes a touch sensing panel 710 and a touch sensing controller 720. Touch sensing panel 710 can have both display and touch sensing capability. Touch sensing controller 720 further includes a touch sensing controller driver 725. Some implementations of touch sensing controller driver 725 are described above with reference to FIG. 6.

In some implementations, touch sensing controller driver 725 generates signals 701A and 701B, which are driven across touch sensing panel 710. A touch on touch sensing panel 710 can change the load, and hence, the magnitude of signals at or near the touch. Signals are sensed across touch sensing panel 710 in a direction orthogonal to the direction the signals 701A and 701B are driven. The signals sensed 703 are routed from touch sensing panel 710 to touch sensing controller 720. Based on the signals sensed 703, it can be determined if there is a touch on the panel, the location of the touch, and/or the pressure of the touch.

It should be appreciated that system 700 can include additional components not shown in FIG. 7, such as, for example, display driver, a processor, a modem, a power management integrated circuit (PMIC), a data storage device, other user interface mechanisms (e.g., keypad, buttons, etc.), etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A low dropout regulator (LDO), comprising:
    an operational amplifier having an output, a positive input, and a negative input;
    a flip voltage follower (FVF) having a gain device, a source follower device, and an adaptive level shifter coupled between a drain of the source follower device and a gate of the gain device; and
    a plurality of replica FVFs, each of the plurality of replica FVFs having
        a replica gain device;
        a replica source follower device having a source to output an output voltage, and a gate coupled to the output of the operational amplifier; and
        a replica adaptive level shifter coupled between a drain of the replica source follower device and a gate of the replica gain device, wherein the replica adaptive level shifter comprises
            a third diode coupled between the drain of the replica source follower device and the gate of the replica gain device;
            a replica compensation capacitor coupled between the drain of the replica source follower and the gate of the replica gain device; and
            a fourth diode coupled between the gate of the replica gain device and a power rail.

2. The LDO of claim 1, wherein a gate of the source follower device is coupled to the output of the operational amplifier and a drain of the gain device is coupled to the negative input of the operational amplifier.

3. The LDO of claim 1, wherein the adaptive level shifter comprises:
    a first diode coupled between the drain of the source follower device and the gate of the gain device;
    a compensation capacitor coupled between the drain of the source follower and the gate of the gain device; and
    a second diode coupled between the gate of the gain device and a power rail.

4. The LDO of claim 3, wherein the source follower device is an n-type metal oxide semiconductor (nMOS) M1, the gain device is an nMOS M2, and the power rail is Vss.

5. The LDO of claim 1, wherein the replica source follower device is an n-type metal oxide semiconductor device (nMOS), the replica gain device is an nMOS, and the power rail is Vss.

* * * * *